FIG. 1.

ROBERT D. TALTY
MAUJ A. COHLY
INVENTOR.

FIG. 2.

Nov. 5, 1968      R. D. TALTY ET AL      3,408,918
METHOD OF PREPARING AN EDIBLE TUBULAR COLLAGEN CASING
Filed March 26, 1965                     3 Sheets-Sheet 3

ROBERT D. TALTY
MAUJ A. COHLY
INVENTOR.

BY
THEIR ATTORNEY

3,408,918
METHOD OF PREPARING AN EDIBLE TUBULAR COLLAGEN CASING

Robert D. Talty and Mauj A. Cohly, Danville, Ill., assignors to Tee-Pak, Inc., Chicago, Ill., a corporation of Illinois
Filed Mar. 26, 1965, Ser. No. 442,885
2 Claims. (Cl. 99—176)

ABSTRACT OF THE DISCLOSURE

An edible tubular collagen casing is prepared from limed animal hides. Animal hides which are either fresh or salt-cured are treated with a lime-containing solution for a period of 3–12 hours to at least partially de-hair the hide. The hide is then mechanically split to remove the epidermal layer and remaining hair and the lime in the corium layer removed by neutralization with a non-toxic acid and washing to remove by-products salts. The neutralized corium layer is ground at a temperature less than 20° C., acid swollen, extruded in tubular form, tanned, washed and dried to produce a translucent non-fibrous edible product.

---

This invention relates to new and useful improvements in artificial sausage casings and more particularly to the production of artificial sausage casings from animal hide collagen.

Natural casings are prepared from the intestines of various edible animals, primarily cattle and sheep. The intestines are removed from the slaughtered animal and are thoroughly cleaned by processes well known in the art. Natural casings, which have been thoroughly cleaned, are stuffed with various sausage meat compositions and formed into sausage links in preparation for cooking. The sausages which are thus formed are cooked by the consumer and the sausage casing eaten with the cooked sausage. In the preparation of certain smoked or precooked sausages, such as frankfurters and the like, the sausage is cooked or smoked or otherwise processed by the meat packer to render it edible without further treatment by the consumer.

Prior to about 1925, substantially all sausage casings were natural casings prepared from animal intestines. Since that time, there have been developed several types of synthetic sausage casings, primarily of regenerated cellulose, which are used in the preparation of the major portion of sausages which are made and sold today. Cellulose casings are used in the preparation of large sausages such as bolognas, salamis, and the like and are removed from the sausage by the customer at the time of final preparation for eating. Regenerated cellulose casings are also used in the preparation of frankfurter sausages wherein the casing is stuffed with sausage emulsion, linked, smoked and cooked, and the casing removed from the finished sausage. Regenerated cellulose casings have not proved satisfactory for the processing of pork sausages inasmuch as cellulose is not edible with the sausage and does not transmit the fat which is released from the sausage during cooking. As a result, there has been some demand for an artificial sausage casing which is edible and which has the properties desired in a casing to be used in the processing of pork sausages.

Over a period of many years, synthetic sausage casings have been prepared from animal collagen. Casings made of collagen have been prepared by processing animal hides to break the collagen into a fibrous structure and extrude the collagen fibers in the form of a doughy mass to produce tubular casings. The casings which have been prepared in this manner have been hardened by treatment with formaldehyde and have been used as removable casings for processing various sausages. These casings have not been edible even though collagen itself is edible.

More recently, edible sausage casings of collagn have been prepared and sold in commercial quantities. In the manufacture of edible collagen casings, considerable emphasis has been placed upon the necessity for using collagen source materials which have not been subjected to a liming treatment. In fact, a number of recent patents describing the production of collagen casing have indicated that it is absolutely necessary to start with an unlimed collagen source material if an edible casing is to be obtained. While the use of unlimed collagen as a starting material has certain advantages, it has the substantial disadvantage of requiring a more severe mechanical treatment for removal of hair and the epidermal layer from the hides from which the collagen is obtained.

It is, therefore, one object of this invention to provide a new and improved process for the preparation of edible collagen casings using limed collagen.

Another object of this invention is to provide a new and improved edible collagen casing prepared from limed collagen.

A feature of this invention is the provision of an improved process for the preparation of edible collagen casings in which a hide collagen source material is subjected to a liming treatment to dehair the collagen and then treated with a weak acid and washed to remove calcium salts prior to formation of a collagen slurry for extrusion into casing form.

Another feature of this invention is the provision of a new and improved edible collagen casing prepared from a limed hide collagen by weak acid deliming prior to formation of the collagen into a slurry and extrusion into tubular casing form.

Other objects and features of this invention will become apparent from time to time throughout the specification and claims as hereinafter related.

Collagen tissues are obtainable from hide and tendon, although hide collagen is preferred for casing manufacture. Collagen is formed of a large number of fibers which in turn consist of a number of fibrils of submicroscopic size. Collagen fibrils have a diameter of the order of 10–50 angstroms and lengths ranging from several thousand up to several million angstroms. Recent patents describing the production of edible collagen casings have emphasized the necessity of using collagen source materials which have not been subjected to a liming treatment for the reason that the liming treatment allegedly prevents the bursting of the collagen fibers to release the fibrils which is necessary for the formation of fibrillar films.

This invention is based upon our discovery that satisfactory edible collagen casings can be prepared using limed animal hides as the source of collagen. In fact, we have found that superior edible casings can be prepared in this manner. In our process, animal hide is treated to remove the blood quickly and then treated with a lime-containing solution for a time sufficient to at least partially (preferably completely) dehair the hide. The hide is then neutralized by treatment with a non-toxic acid, at a pH of 2.5–6.5, to form soluble calcium salts. The neutralized hide is washed sufficiently to remove most of the by-product salts. The hide may be split or mechanically dehaired to remove the residual hair and epidermal layer either before or after neutralization. Next, the neutralized and washed hide is defleshed, cut into small pieces and then ground at a temperature less than about 20° C. into a finely-divided form and mixed with sufficient water to produce a slurry having a collagen content of about 2–6%.

The collagen slurry is treated with a weak acid such as citric acid or lactic acid to cause the collagen fibers to swell and burst, thus releasing the collagen fibrils and destroying the identity of the individual fibers. The swollen collagen slurry is extruded through an annular die to form a collagen tube. The collagen tube which is formed by extrusion through the die passes into a coagulating bath containing a dehydrating and deswelling agent. The coagulating bath is preferably a concentrated solution of sodium sulfate or ammonium sulfate, although other dehydrating agents such as acetone may be used.

In carrying out this invention as above described, there are certain features of the process which are quite critical. Fresh or salt cured hides are used. The blood must be removed from the hide quickly and curing or liming started as soon as possible to prevent biological degradation of the hide. The liming for removal of hair is carried out as fast as possible. Liming periods of less than four days are used and periods of 3–12 hours or less are preferred. Even after curing or liming the hide must be processed quickly. In general the hide must be finally converted into a collagen slurry in less than 15 days.

In preparing the hide it is essential that the limed hide pieces be treated with a solution of a non-toxic acid capable of forming soluble calcium salts at a pH of 2.5–6.5. Suitable acids which form soluble calcium salts and are non-toxic include the following: weak organic acids, such as, acetic acid, malic acid, maleic acid, butyric acid, isobutyric acid, fumaric acid, succinic acid, valeric acid, glutamic acid, levulinic acid, lactic acid, citric acid, caprylic acid, gluconic acid, benzoic acid, malonic acid, ascorbic acid, glycerophosphoric aid, and mineral acids, such as, phosphoric acid, and hydrochloric acid. The hide which has been subjected to a liming treatment is treated with a solution of an acid as described above to neutralize the excess calcium and permit its removal as soluble calcium salts. The acids must be used in this treatment at a pH of 2.5–6.5 to avoid degradation of the collagen resulting either from the effect of strong acid per se or of too high a rate of neutralization. These acids are added at a rate just sufficient to maintain a pH of 2.5–6.5.

After the hide has been delimed and washed and ground into very small particles to produce a slurry, it is treated with an acid such as citric acid or lactic acid to adjust the pH to the range of 2.5–3.7 thus causing the collagen to swell and the fiber bundles to burst. The mass of collagen in the slurry is preferably maintained at a value in the range from about 2–6%, preferably about 3.5–5%.

The process for the preparation of collagen casings in accordance with this invention will be understood more fully by reference to the following description and the accompanying drawings, in which.

Figure 1:
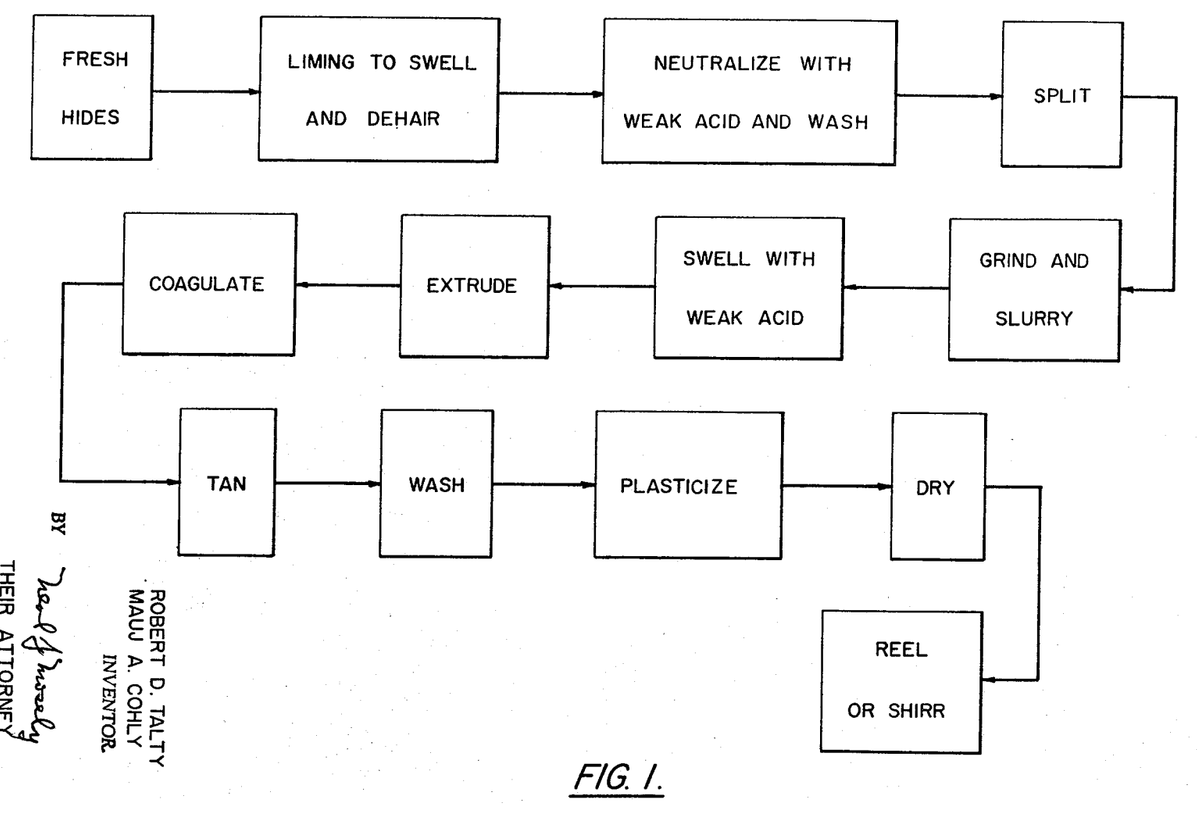
FIG. 1 is a flow diagram illustrating the sequence of steps in the manufacture of edible collagen casings from animal hides.

Referring to FIG. 1, there are shown diagrammatically the various steps which are followed in the preparation of edible collagen casings in accordance with this invention. Some of these steps have been described above but will be repeated at this point to illustrate their relationship to the preparation of the final product. Animal hides are cut into suitable pieces (hide trimmings may also be used) and are treated with a suitable lime solution for removal of hair. The hide may also be limed before cutting into small pieces. The lime solution is preferably a solution containing excess solid lime $(Ca(OH)_2)$, sodium sulfhydrate $(NaSH)$, and dimethylamine sulfate $$((CH_3)_2(NH_2)_2SO_4)$$

After treatment in such a solution for a period of up to four days (3–12 hours or less is preferred), the hides are removed and neutralized and washed. The hide is treated with an acid as described above and is subjected to repeated squeezing and soaking in water to wash out the soluble by-product salts which are formed. After neutralization, the hides are split to remove the epidermal layer and any remaining hair or are subjected to any other suitable mechanical dehairing process.

Figure 3:
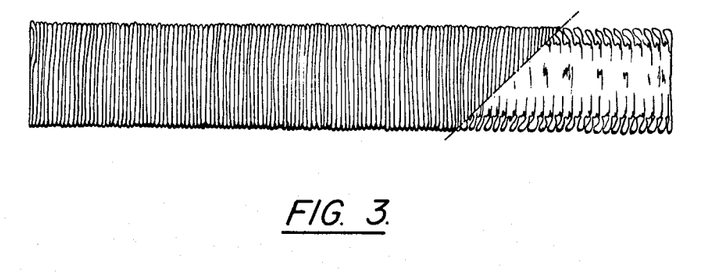
FIG. 3 is an extruded edible collagen casing prepared in accordance with this invention as processed in a shirred form.

The hides which are thus prepared are ground into particles of very small size to produce an aqueous slurry having a collagen content in the range from about 2–6%, preferably about 3.5–5.0%. The collagen is maintained at a temperature less than about 20° C. (preferably less than 10° C.) during the grinding by repeated addition of ice to the mixture. The collagen slurry which is thus prepared is treated with a dilute solution of weak acid to swell and burst the collagen fibers as previously described. The swollen collagen slurry is then extruded through an annular die to produce a thin-walled tubular product suitable for use as sausage casings after further processing. In order to obtain maximum strength in the product casing, the collagen slurry is preferably extruded through a die having rotating inner and/or outer parts which is well known in the prior art in the preparation of the collagen casings, vide Becker U.S. Patent 2,046,541. The collagen slurry is extruded through the die into a coagulating bath consisting of a concentrated solution of an alkali metal sulfate, such as sodium sulfate, or ammonium sulfate. The thin-walled collagen tube which is formed in the coagulating bath is passed into a tanning bath and subsequently washed and plasticized. The casing which is thus prepared is inflated with air or other gas and passed through a dryer. From the dryer, the casing is either rolled up on reels or is passed onto a shirring machine where it is shirred into short strands as illustrated in FIG. 3 of the drawings. It is preferred to shirr the casing directly from the dryer since it is easier to maintain the casing in an inflated state. The casing may be shirred on shirring machines of the type used in shirring cellulosic casings, vide Blizzard et al. 2,722,714; 2,722,715; 2,723,201; or Ives 3,112,517.

Figure 2:
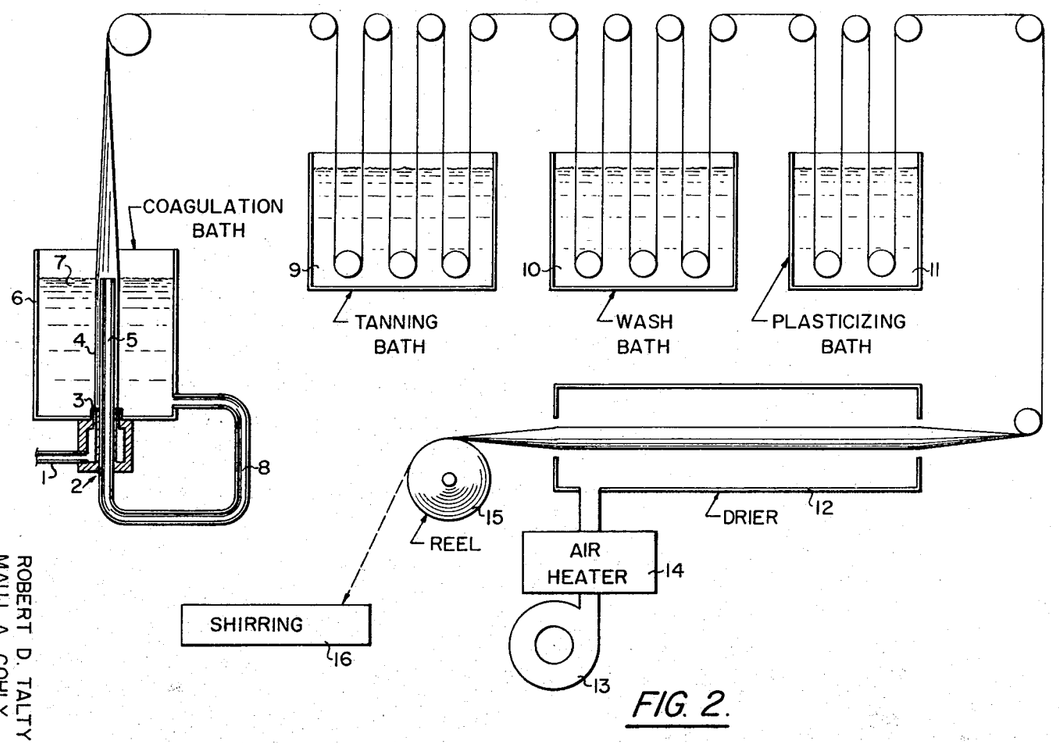
FIG. 2 is a flow diagram illustrating schematically the more important steps in the extrusion and processing of edible collagen casings.

In FIG. 2 of the drawings, the steps from extrusion through reeling or shirring are illustrated schematically in slightly more detail. The collagen slurry is introduced through inlet conduit 1 into die 2 having an annular die outlet 3 through which casing 4 is extruded. The die 2 has an inner tube 5 which extends upwardly within the extruded casing to remove coagulating bath from within the extruded casing. The die 2 is located at the bottom of container 6 which contains coagulating bath 7. Coagulating bath 7 is circulated through conduit 8 from tube 5 for removal of the coagulating bath from inside the extruded casing. Casing 4 which is coagulated in the bath 7 passes over a series of rollers and is directed through a tanning bath 9 which may contain a solution of any suitable non-toxic (i.e. non-toxic in the finished product) tanning agent for collagen the tanning bath is preferably a solution of a soluble non-toxic ferric or aluminum salt.

From the tanning bath 9, the casing passes through wash bath 10 where excess tanning agent is washed out of the casing and finally through plasticizing bath 11 which introduces a small amount of a plasticier such as glycerine into the casing. From the plasticizing bath 11 the casing passes through dryer 12 where it is inflated and dried with the aid of air circulated by fan or blower 13 through air heater 14. After leaving dryer 12, the casing may be rolled up on reel 15 but is preferably passed to a shirring machine shown diagrammatically as 16. If casing is first rolled up on reels it may be subsequently shirred if desired. The shirring machine which is used for preparation of shirred strands of casing may be of any suitable design such as the types commonly used in the shirring of regenerated cellulose sausage casings as noted above.

Figure 4:
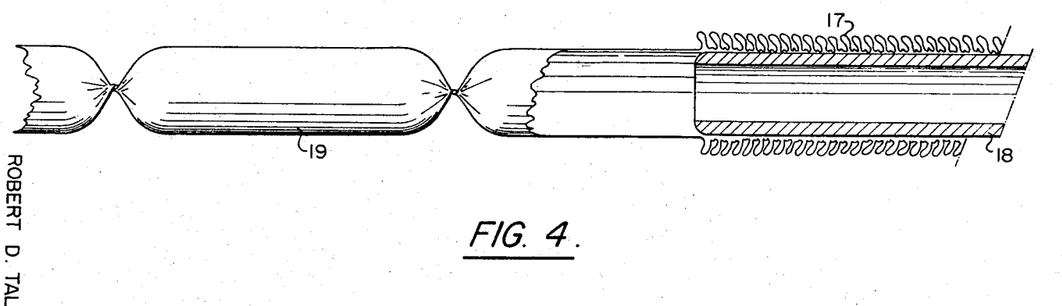
FIG. 4 is a schematic view showing the filling of the casing with sausage meat on an extrusion horn or nozzle and the preparation of sausage links therefrom.

After the casing is shirred into individual short strands, it is packaged and heated at 60-80° C. in an atmosphere of 20-50% relative humidity for several hours prior to shipment to the meat packer. In FIG. 4, the stuffing of the casing is illustrated. A strand of edible collagen casing 17 is placed on a tubular stuffing horn 18 which is connected to a pressurized source of sausage emulsion (not shown). The sausage emulsion is passed through the stuffing horn 18 into the end of casing 17, and the casing is filled with sausage meat and twisted at suitable intervals to provide links of sausage 19. The links may be severed from each other and packaged in a suitable overwrap following conventional meat packaging techniques. When the sausage is cooked by the consumer, the casing is found to be quite strong and shrinks with the meat during cooking. The casing may be prestuck, if desired, to permit more rapid release of fat during the cooking of the sausages.

The following nonlimiting examples are illustrative of the application of this invention in the preparation of a satisfactory edible collagen casing:

EXAMPLE 1

In this example, the preparation of edible collagen casings from limed animal hides is illustrated. Fresh heifer hides were limed for a period of three hours at 10° C. in a liming solution equal to 300% of the weight of the hide being treated. The solution contained 5% lime, 1% sodium sulfhydrate, and 3% dimethylamine sulfate based on the weight of hide treated. At the end of the three-hour treatment, the hair was substantially loosened and partially removed.

The hide was defleshed and then subjected to a neutralization treatment with a non-toxic acid as described above. The hide was treated with a dilute solution of lactic acid (pH 5) by soaking overnight. This treatment is effective to completely neutralize excess lime present in the hide and converts the lime into soluble calcium salts which are removed by washing. After neutralization, the hide was split to remove the remaining hair and epidermal layer. Next, the limed and neutralized hide splits were cut into small square or rectangular sections, e.g., ¼–4 inches on a side and then repeatedly soaked in water and squeezed in a food press to remove the soluble calcium salts.

The small pieces or treated hide were converted to a fine pulp by successive passes through a meat grinder. In this grinding operation, sufficient ice was mixed with the hide splits to maintain the temperature below about 20° C. The successive passes through the meat grinder used successively smaller dies, the smallest being 3/64 inch. At this point, sufficient water was added to the pulp to produce a mixture consisting of about 90% water and 10% collagen.

The collagen pulp was then treated with sufficient dilute lactic acid to produce a pH of 2.5–3.7. After thorough mixing, the pulp and acid were stored overnight at a temperature of 3° C. to swell. At the end of this time, the collagen had swollen and taken up all of the water in the slurry. The swollen collagen was mixed with additional water and acid to produce a thin homogeneous paste containing 4% collagen and 1.2% lactic acid (to maintain a pH of 2.5–3.7). This paste was further homogenized, filtered to remove any solid contaminants, and deaerated.

The slurry is then pumped under pressure through the extrusion die as previously described into a coagulating bath consisting of 42% ammonium sulfate (sodium sulfate can also be used) in water. When the collagen is extruded as a thin-walled tube into this concentrated solution of ammonium sulfate, the collagen fibrils are dehydrated and collapse to form a film which is sufficiently coherent for further processing. As shown in FIG. 2 of the drawings, the coagulation bath is circulated both inside and outside the tube to maintain the tube in an inflated condition and insure proper coagulation of the casing both on the inside and outside.

The casing next passes into a tanning bath which comprises a solution of 10% ferric ammonium sulfate and 20% ammonium sulfate. In this bath, the casing is hardened or tanned. The casing passes over a series of rollers in the tanning bath to provide multiple passes giving a residence time of at least one minute in the bath. The casing then passes into a wash bath where it is maintained for a period of about ten minutes by a multiple pass arrangement. After washing, the casing passes through a plasticizing bath consisting of 5% glycerine in water.

From the plasticizing bath, the casing passes through a dryer where it is inflated with compressed air, and heated air is circulated over the surface of the inflated casing. The casing was dried by air maintained at a temperature of 70° C. circulated at a rate of 200 cubic feet per minute. After drying, the casing is preferably shirred (since this permits introduction of air to maintain the casing inflated in the dryer) or may be first reeled and then shirred prior to packaging. Casing which was prepared in this manner was rewet and tested for tensile strength on an Instron tester. The casing had a longitudinal strength of approximately 1,800 p.s.i and a transverse strength of approximately 560 p.s.i. This casing was superior both in longitudinal and transverse tensile strengths to casing prepared from unlimed collagen. Casings made by the above-described method are uniform in diameter and in wall thickness. The casing is formed of a smooth film which is substantially free of collagen fibers of macroscopic size. The casing film is translucent and apparently formed of collagen fibrils that are essentially randomly oriented. The orientation of collagen fibrils in the film and the resulting relative variation in longitudinal and transverse strength is largely a function of the conditions of extrusion and the type of extruder used.

The casing prepared as described above could be shirred without difficulty using a shirring machine of the type used for the shirring of regenerated cellulose casing. The shirred casing could be stuffed and linked without difficulty.

EXAMPLE 2

In this example, another preparation of edible collagen casings from limed animal hides is illustrated. Fresh steer hides are limed for a period of six hour at 5° C. in a liming solution equal to 300% of the weight of the hide being treated. The solution contains 5% lime, 1% sodium sulfhydrate, and 3% dimethylamine sulfate based on the weight of hide treated. At the end of the six-hour treatment, the hair and a portion of the keratinous layer are substantially loosened and partially removed.

The hide is then subjected to a neutralization treatment with a non-toxic weak acid as described above. The hide is treated with a dilute solution of acetic acid (pH 4.5) by soaking overnight. This treatment is effective to completely neutralize excess lime present in the hide and converts the lime into soluble calcium salts which are removed by washing. After neutralization, the hide was split to remove the remaining hair and epidermal layer. Next, the limed and neutralized hide splits are cut into small square or rectangular sections, e.g., ¼–4 inches on a side and then repeatedly soaked in water and squeezed in a food press to remove soluble calcium salts.

The small pieces of hide are converted to a fine pulp by successive passes through a meat grinder. In this grinding operation, sufficient ice is mixed with the hide splits to maintain the temperature below about 15° C. The successive passes through the meat grinder use successively smaller dies, the smallest being ³⁄₆₄ inch. At this point, sufficient water is added to the pulp to produce a mixture consisting of about 90% water and 10% collagen.

The collagen pulp is then treated with sufficient citric acid to produce a pH of 2.5–3.5. After thorough mixing, the pulp and acid are stored overnight at a temperature of 3° C. to swell. At the end of this time, the collagen will have swollen and taken up all of the water in the slurry. The swollen collagen is mixed with additional water and acid to produce a homogeneous paste containing 4% collagen and sufficient citric acid to maintain a pH of 2.5–3.5. This slurry is further homogenized, filtered to remove any solid contaminants, and deaerated.

The slurry is then pumped under pressure through the extrusion die as previously described into a coagulating bath consisting of 40% ammonium sulfate (sodium sulfate can also be used) in water. When the collagen is extruded as a thin-walled tube into this concentrated solution of ammonium sulfate, the collagen fibrils are dehydrated and collapse to form a film which is sufficiently coherent for further processing. As shown in FIG. 2 of the drawings, the coagulation bath is circulated both inside and outside the tube to maintain the tube in an inflated condition and insure proper coagulation of the casing both on the inside and outside.

The casing next passes into a tanning bath which comprises a solution of 10% ferric ammonium sulfate and 20% ammonium sulfate. In this bath, the casing is hardened or tanned. The casing passes over a series of rollers in the tanning bath to provide multiple passes giving a residence time of at least one minute in the bath. The casing then passes into a wash bath where it is maintained for a period of about ten minutes by a multiple pass arrangement. After washing, the casing passes through a plasticizing bath consisting of 10% glycerine in water.

From the plasticizing bath, the casing passes through a dryer where it is inflated with compressed air, and heated air is circulated over the surface of the inflated casing. The casing is dried by air maintained at a temperature of 75° C. circulated at a rate of 180 cubic feet per minute. After drying, the casing is preferably shirred or may be first reeled and then shirred prior to packaging. This casing is equivalent in longitudinal and transverse tensile strengths to casing prepared from unlimed collagen. Casings made by the above-described method are uniform in diameter and in wall thickness. The casing is formed of a smooth film which is substantially free of collagen fibers of macroscopic size. The casing film is translucent and apparently formed of collagen fibrils that are essentially randomly oriented. The orientation of collagen fibrils in the film and the resulting relative variation in longitudinal and transverse strength is largely a function of the conditions of extrusion and the type of extruder used.

EXAMPLE 3

In this example, another preparation of edible collagen casings from limed animal hides is illustrated. Salt-cured steer hides are limed for a period of 72 hours at 5° C. in a liming solution equal to 400% of the weight of the hide being treated containing 5% lime, 0.3% NaSH, and 0.3% $Na_2S$ based on the weight of hide treated. At the end of this treatment, the hair and a portion of the keratinous layer are substantially loosened and partially removed.

The hide is then subjected to a neutralization treatment with a non-toxic acid as described above. The hide is treated with sufficient propionic acid (pH 5) by soaking overnight. This treatment is effective to completely neutralize excess lime present in the hide and converts the lime into soluble calcium salts which are removed by washing. After neutralization, the hide was split to remove the remaining hair and epidermal layer. Next, the limed and neutralized hide splits are cut into small square or rectangular sections, e.g., ¼–4 inches on a side and then repeatedly soaked in water and squeezed in a food press to remove the soluble calcium salts. The pieces of hide are converted to a fine pulp by successive passes through a meat grinder. In this grinding operation, sufficient ice is mixed with the hide splits to maintain the temperature below about 10° C. The successive passes through the meat grinder use successively smaller dies, the smallest being ³⁄₆₄ inch. At this point, sufficient water is added to the pulp to produce a mixture consisting of about 90% water and 10% collagen.

The collagen pulp is then treated with sufficient dilute lactic acid to produce a pH of 2.5–3.7. After thorough mixing, the pulp and acid are stored overnight at a temperature of 3° C. to swell. At the end of this time, the collagen will have swollen and taken up all of the water in the slurry. The swollen callogen is mixed with additional water and acid to produce a homogeneous paste containing 4% collagen and 1.2% lactic acid (pH 2.5–3.7). This slurry is further homogenized, filtered to remove any solid contaminants, and deaerated.

The slurry is then pumped under pressure through the extrusion die as previously described into a coagulating bath consisting of 42% ammonium sulfate (sodium sulfate can also be used) in water. When the collagen is extruded as a thin-walled tube into this concentrated solution of ammonium sulfate, the collagen fibrils are dehydrated and collapse to form a film which is sufficiently coherent for further processing. As shown in FIG. 2 of the drawings, the coagulation bath is circulated both inside and outside the tube to maintain the tube in an inflated condition and insure proper coagulation of the casing both on the inside and outside.

The casing next passes into a tanning bath which comprises a solution of 10% ferric sulfate and 20% ammonium sulfate. In this bath, the casing is hardened or tanned. The casing passes over a series of rollers in the tanning bath to provide multiple passes giving a residence time of at least one minute in the path. The casing then passes into a wash bath where it is maintained for a period of about ten minutes by a multiple pass arrangement. After washing, the casing passes through a plasticizing bath consisting of 5% glycerine in water.

From the plasticizing bath, the casing passes through a dryer where it is inflated with compressed air, and heated air is circulated over the surface of the inflated casing. The casing is dried by air maintained at a temperature of 60° C. circulated at a rate of 300 cubic feet per minute. After drying, the casing is preferably shirred but may be first reeled and then shirred prior to packaging. This casing is equivalent in longitudinal and transverse tensile strengths to casing prepared from unlimed collagen. Casings made by the above-described method are uniform in diameter and in wall thickness. The casing is formed of a smooth film which is substantially free of collagen fibers of macroscopic size. The casing film is translucent and apparently formed of collagen fibrils that are essentially randomly oriented. The orientation of collagen fibrils in the film and the resulting relative variation in longitudinal and transverse strength is largely a function of the conditions of extrusion and the type of extruder used.

EXAMPLE 4

In this example, still another preparation of edible collagen casings from limed animal hides is illustrated. Fresh steer hides are limed for a period of 12 hours at 10° C. in a liming solution equal to 300% of the weight of the hide being treated and containing 5% lime, 1% sodium sulfhydrate, and 3% dimethylamine sulfate based on the weight of hide treated. At the end of the 12-hour treatment, the hair and a portion of the keratinous layer are substantially loosened and partially removed.

The hide is then subjected to a neutralization treatment with a non-toxic acid as described above. The hide was treated with a dilute solution of citric acid (pH5) by soaking overnight. This treatment is effective to completely neutralize excess lime present in the hide and converts the lime into soluble calcium salts which are removed by washing. The hide is scraped mechanically to remove hair and the epidermal layer. Next, the limed and neutralized hide splits are cut into small square or rectangular sections, e.g., ¼–4 inches on a side, soaked in water and squeezed to remove calcium salts and then converted to a fine pulp by successive passes through a meat grinder. In this grinding operation, sufficient ice is mixed with the hide to maintain the temperature below about 20° C. The successive passes through the meat grinder use successively smaller dies, the smallest being 3/64 inch. At this point, sufficient water is added to the pulp to produce a mixture consisting of about 90% water and 10% collagen.

The collagen pulp is then treated with sufficient dilute citric acid to adjust the pH to 2.5–3.7. After thorough mixing, the pulp and acid are stored overnight at a temperature of 3° C. to swell. At the end of this time, the collagen will have swollen and taken up all of the water in the slurry. The swollen collagen is mixed with additional water to produce a homogeneous slurry containing 4% collagen and 1.2% citric acid (pH 2.5–3.7). This slurry is further homogenized, filtered to remove any solid contaminants, and deaerated.

The slurry is then pumped under pressure through the extrusion die as previously described into a coagulating bath consisting of 42% sodium sulfate in water. When the collagen is extruded as a thin-walled tube into this concentrated solution of sodium sulfate, the collagen fibrils are dehydrated and collapse to form a film which is sufficiently coherent for further processing. As shown in FIG. 2 of the drawings, the coagulation bath is circulated both inside and outside the tube to maintain the tube in an inflated condition and insure proper coagulation of the casing both on the inside and outside.

The casing next passes into a tanning bath which comprises a solution of 10% ferric chloride and 20% ammonium sulfate. In this bath, the casing is hardened or tanned. The casing passes over a series of rollers in the tanning bath to provide multiple passes giving a residence time of at least one minute in the bath. The casing then passes into a wash bath where it is maintained for a period of about ten minutes by a multiple pass arrangement. After washing, the casing passes through a plasticizing bath consisting of 10% glycerine in water.

From the plasticizing bath, the casing passes through a dryer where it is inflated with compressed air, and heated air is circulated over the surface of the inflated casing. The casing is dried by air maintained at a temperature of 70° C. circulated at a rate of 200 cubic feet per minute. After drying, the casing is preferably shirred but may be first reeled and then shirred prior to packaging. This casing is equivalent in longitudinal and transverse tensile strengths to casing prepared from unlimed collagen produced in accordance with well known prior art procedures. Casing made by the above-described method are uniform in diameter and in wall thickness. The casing is formed of a smooth film which is substantially free of collagen fibers of macroscopic size. The casing film is translucent and apparently formed of collagen fibrils that are essential randomly oriented. The orientation of collagen fibrils in the film and the resulting relative variation in longitudinal and transverse strength is largely a function of the conditions of extrusion and the type of extruder used.

EXAMPLE 5

In this example, another preparation of edible collagen casings from limed animal hides is illustrated. Fresh calf hides are limed for a period of six hours at 5° C. in a liming solution equal to 300% of the weight of the hide being treated and containing 5% lime, 1% sodium sulfhydrate, and 3% dimethylamine sulfate based on the weight of hide treated. At the end of the six-hour treatment, the hair and a portion of the keratinous layer are substantially removed.

The hide is then subjected to a neutralization treatment with a non-toxic acid as described above. The hide is treated with a dilute solution of phosphoric acid (pH 5) by soaking overnight. This treatment is effective to completely neutralize excess lime present in the hide and converts the lime into soluble calcium salts which are removed by washing. The hide is scraped mechanically to remove hair and the epidermal layer. Next, the limed and neutralized hide splits are cut into small square or rectangular sections, e.g., ¼–4 inches on a side, soaked in water and squeezed to remove calcium salts and then converted to a fine pulp by successive passes through a meat grinder. In this grinding operation, sufficient ice is mixed with the hide splits to maintain the temperature below about 20° C. The successive passes through the meat grinder use successively smaller dies, the smallest being 3/64 inch. At this point, sufficient water is added to the pulp to produce a mixture consisting of about 90% water and 10% collagen.

The collagen pulp is then treated with sufficient dilute lactic acid to produce a pH of 2.5–3.7. After thorough mixing, the pulp and acid are stored overnight at a temperature of 3° C. to swell. At the end of this time, the collagen will have swollen and taken up all of the water in the slurry. The swollen collagen is mixed with additional water to produce a homogeneous slurry containing 4% collagen and 1.2% lactic acid (pH of 2.5–3.7). This slurry is further homogenized, filtered to remove any solid contaminants, and deaerated.

The slurry is then pumped under pressure through the extrusion die as previously described into a coagulating bath consisting of 42% sodium sulfate in water. When the collagen is extruded as a thin-walled tube into this concentrated solution of sodium sulfate, the collagen fibrils are dehydrated and collapse to form a film which is sufficiently coherent for further processing. As shown in FIG. 2 of the drawings, the coagulation bath is circulated both inside and outside the tube to maintain the tube in an inflated condition and insure proper coagulation of the casing both on the inside and outside.

The casing next passes into a conventional alum tanning bath. In this bath, the casing is hardened or tanned. The casing passes over a series of rollers in the tanning bath to provide multiple passes giving a residence time of at least one minute in the bath. The casing then passes into a wash bath where it is maintained for a period of about ten minutes by a multiple pass arrangement. After washing, the casing passes through a plasticizing bath consisting of 5% glycerine in water.

From the plasticizing bath, the casing passes through a dryer where it is inflated with compressed air, and heated air is circulated over the surface of the inflated casing. The casing is dried by air maintained at a temperature of 70° C. circulated at a rate of 200 cubic feet per minute. After drying, the casing is preferably shirred but may be first reeled and then shirred prior to packaging. This casing is equivalent in longitudinal and transverse tensile strengths to casing prepared from unlimed collagen produced in accordance with well known prior art procedures. Casing made by the above-described method are uniform in diameter and in wall thickness. The casing is formed of a smooth film which is substantially free of collagen fibers of macroscopic size. The casing film is translucent and apparently formed of collagen fibrils that are essentially randomly oriented. The orientation of collagen fibrils in the film and the resulting relative variation in longitudinal and transverse strength is largely a funtcion of the conditions of extrusion and the type of extruder used.

EXAMPLE 6

In this example, another preparation of edible collagen casings from limed animal hides is illustrated. Fresh cow hides are limed for a period of six hours at 5° C. in a liming solution equal to 300% of the weight of the hide being treated and containing 5% lime, 1% sodium sulfhydrate, and 3% dimethylamine sulfate based on the weight of hide treated. At the end of the six-hour treatment, the hair and a portion of the keratinous layer are substantially removed.

The hide is then subjected to a neutralization treatment with a non-toxic acid as described above. The hide is treated with a dilute solution of glycerophosphoric acid (pH 5) by soaking overnight. This treatment is effective to completely neutralize excess lime present in the hide and converts the lime into soluble calcium salts which are removed by washing. After neutralization, the hide was split to remove the remaining hair and epidermal layer. Next, the limed and neutralized hide splits are cut into small square or rectangular sections, e.g., ¼–4 inches on a side, soaked in water and squeezed to remove calcium salts and then converted to a fine pulp by successive passes through a meat grinder. In this grinding operation, sufficient ice is mixed with the hide splits to maintain the temperature below about 20° C. The successive passes through the meat grinder use successively smaller dies, the smallest being ³⁄₆₄ inch. At this point, sufficient water is added to the pulp to produce a mixture consisting of about 90% water and 10% collagen.

The collagen pulp is then treated with sufficient dilute lactic acid to produce a pH of 2.5–3.7. After thorough mixing, the pulp and acid are stored overnight at a temperature of 3° C. to swell. At the end of this time, the collagen will have swollen and taken up all of the water in the slurry. The swollen collagen is mixed with additional water to produce a homogeneous slurry containing 3.8% collagen and 1.1% lactic acid (pH 2.5–3.7). This slurry is further homogenized, filtered to remove any solid contaminants, and deaerated.

The slurry is then pumped under pressure through the extrusion die as previously described into a coagulating bath consisting of 30% ammonium sulfate (sodium sulfate can also be used) in water. When the collagen is extruded as a thin-walled tube into this concentrated solution of ammonium sulfate, the collagen fibrils are dehydrated and collapse to form a film which is sufficiently coherent for further processing. As shown in FIG. 2 of the drawings, the coagulation bath is circulated both inside and outside the tube to maintain the tube in an inflated condition and insure proper coagulation of the casing both on the inside and outside.

The casing next passes into a tanning bath which comprises a solution of 10% ferric sulfate. In this bath, the casing is hardened or tanned. The casing passes over a series of rollers in the tanning bath to provide multiple passes giving a residence time of at least one minute in the bath. The casing then passes into a wash bath where it is maintained for a period of about ten minutes by a multiple pass arrangement. After washing, the casing passes through a plasticizing bath consisting of 5% glycerine in water.

From the plasticizing bath, the casing passes through a dryer where it is inflated with compressed air, and heated air is circulated over the surface of the inflated casing. The casing is dried by air maintained at a temperature of 70° C. circulated at a rate of 200 cubic feet per minute. After drying, the casing is preferably shirred but may be first reeled and then shirred prior to packaging. This casing is equivalent in longitudinal and transverse tensile strengths to casing prepared from unlimed collagen produced in accordance with well known prior art procedures. Casings made by the above-described method are uniform in diameter and in wall thickness. The casing is formed of a smooth film which is substantially free of collagen fibers of macroscopic size. The casing film is translucent and apparently formed of collagen fibrils that are essentially randomly oriented. The orientation of collagen fibrils in the film and the resulting relative variation in longitudinal and transverse strength is largely a function of the conditions of extrusion and the type of extruder used.

EXAMPLE 7

In this example, still another preparation of edible collagen casings from limed animal hides is illustrated. Fresh cow hides are limed for a period of 24 hours at 10° C. in a liming solution equal to 300% of the weight of the hide being treated and containing 5% lime, 1% sodium sulfhydrate, and 3% dimethylamine sulfate based on the weight of hide treated. At the end of the 24-hour treatment, the hair and a portion of the keratinous layer are substantially loosened and partially removed.

The hide is then subjected to a neutralization treatment with a non-toxic weak acid as described above. The hide is treated with a dilute solution of glutamic acid (pH 5) by soaking overnight. This treatment is effective to completely neutralize excess lime present in the hide and converts the lime into soluble calcium salts which are removed by washing.

Next, the limed and neutralized hide is split, cut into small square or rectangular sections, e.g. ¼–4 inches on a side, soaked in water and squeezed to remove calcium salts and then converted to a fine pulp by successive passes through a meat grinder. In this grinding operation, sufficient ice is mixed with the hide splits to maintain the temperature below about 20° C. The successive passes through the meat grinder use successively smaller dies, the smallest being ³⁄₆₄ inch. At this point, sufficient water is added to the pulp to produce a mixture consisting of about 90% water and 10% collagen.

The collagen pulp is then treated with sufficient dilute lactic acid to produce a pH of 2.5–3.7. After thorough mixing, the pulp and acid are stored overnight at a temperature of 3° C. to swell. At the end of this time, the collagen will have swollen and taken up all of the water in the slurry. The swollen collagen is mixed with additional water and acid to produce a homogeneous slurry containing 4% collagen and 1.2% lactic acid (pH 2.5–3.7). This slurry is further homogenized, filtered to remove any solid contaminants, and deaerated.

The slurry is then pumped under pressure through the extrusion die as previously described into a coagulating bath consisting of 30% ammonium sulfate (sodium sulfate can also be used) in water. When the collagen is extruded as a thin-walled tube into this concentrated solution of ammonium sulfate, the collagen fibrils are dehydrated and collapse to form a film which is sufficiently coherent for further processing. As shown in FIG. 2 of the drawings, the coagulation bath is circulated both inside and outside the tube to maintain the tube in an inflated condition and insure proper coagulation of the casing both on the inside and outside.

The casing next passes into a conventional alum tanning bath. In this bath, the casing is hardened or tanned. The casing passes over a series of rollers in the tanning bath to provide multiple passes giving a residence time of at least one minute in the bath. The casing then passes into a wash bath where it is maintained for a period of about ten minutes by multiple pass arrangement. After washing, the casing passes through a plasticizing bath consisting of 5% glycerine in water.

From the plasticizing bath, the casing passes through a dryer where it is inflated with compressed air, and heated air is circulated over the surface of the inflated casing. The casing was dried by air maintained at a temperature of 70° C. circulated at a rate of 200 cubic feet per minute. After drying, the casing is preferably shirred but may be first reeled and then shirred prior to packaging. This casing is equivalent in longitudinal and transverse tensile strengths to casing prepared from unlimed collagen produced in accordance with well known prior art procedures. Casings made by the above-described method are uniform in diameter and in wall thickness. The casing is formed of a smooth film which is substantially free of collagen fibers of macroscopic size. The casing film is translucent and apparently formed of collagen fibrils that are essentially randomly oriented. The orientation of collagen fibrils in the film and the resulting relative variation in longitudinal and transverse strength is largely a function of the conditions of extrusion and the type of extruder used.

EXAMPLE 8

In this example, another preparation of edible collagen casings from limed animal hides is illustrated. Fresh steer hides are limed for a period of 1.5 hours at 10° C. in a liming solution equal to 300% of the weight of the hide being treated and containing 5% lime, 2% sodium sulfyhydrate (NaSH), and 3% dimethylamine sulfate based on the weight of hide treated. At the end of the 1.5-hour treatment, the hair and a portion of the keratinous layer are substantially loosened and partially removed.

The hide is then subjected to a neutralization treatment with a non-toxic acid as described above. The hide was treated with a very dilute solution of hydrochloric acid (pH 5) by soaking overnight. This treatment is effective to completely neutralize excess lime present in the hide and converts the lime into soluble calcium salts which are removed by washing. After neutralization, the hide was split to remove the remaining hair and epidermal layer. Next, the limed and neutralized hide splits are cut into small square or rectangular sections, e.g., ¼–4 inches on a side, soaked in water and squeezed to remove calcium salts and then converted to a fine pulp by successive passes through a meat grinder. In this grinding operation, sufficient ice is mixed with the hide splits to maintain the temperature below about 20° C. The successive passes through the meat grinder use successively smaller dies, the smallest being 3/64 inch. At this point, sufficient water is added to the pulp to produce a mixture consisting of about 90% water and 10% collagen.

The collagen pulp is then treated with sufficient dilute lactic acid to produce a pH of 2.5–3.7. After thorough mixing, the pulp and acid are stored overnight at a temperature of 3° C. to swell. At the end of this time, the collagen will have swollen and taken up all of the water in the slurry. The swollen collagen is mixed with additional water and acid to produce a homogeneous slurry containing 4% collagen and 1.2% lactic acid (pH 2.5–3.7). This slurry is further homogenized, filtered to remove any solid contaminants, and deaerated.

The slurry is then pumped under pressure through the extrusion die as previously described into a coagulating bath consisting of 42% ammonium sulfate (sodium sulfate can also be used) in water. When the collagen is extruded as a thin-walled tube into this concentrated solution of ammonium sulfate, the collagen fibrils are dehydrated and collapse to form a film which is sufficiently coherent for further processing. As shown in FIG. 2 of the drawings, the coagulation bath is circulated both inside and outside the tube to maintain the tube in an inflated condition and insure proper coagulation of the casing both on the inside and outside.

The casing next passes into a tanning bath which comprises a solution of 10% ferric ammonium sulfate and 20% ammonium sulfate. In this bath, the casing is hardened or tanned. The casing passes over a series of rollers in the tanning bath to provide multiple passes giving a residence time of at least one minute in the bath. The casing then passes into a wash bath where it is maintained for a period of about ten minutes by a multiple pass arrangement. After washing, the casing passes through a plasticizing bath consisting of 5% glycerine in water.

From the plasticizing bath, the casing passes through a dryer where it is inflated with compressed air, and heated air is circulated over the surface of the inflated casing. The casing is dried by air maintained at a temperature of 70° C. circulated at a rate of 200 cubic feet per minute. After drying, the casing is preferably shirred but may be first reeled and then shirred prior to packaging. This casing is equivalent in longitudinal and transverse tensile strengths to casing prepared from unlimed collagen produced in accordance with well known prior art procedures. Casings made by the above-described method are uniform in diameter and in wall thickness. The casing is formed of a smooth film which is substantially free of collagen fibers of macroscopic size. The casing film is translucent and apparently formed of collagen fibrils that are essentially randomly oriented. The orientation of collagen fibrils in the film and the resulting relative variation in longitudinal and transverse strength is largely a function of the conditions of extrusion and the type of extruder used.

EXAMPLE 9

In this example, another preparation of edible collagen casings from limed animal hides is illustrated. Salt-cured cow hides are limed for a period of six hours at 50° C. in a liming solution equal to 300% of the weight of the hide being treated and containing 5% lime, 1% sodium sulfhydrate (NaSH), and 3% dimethylamine sulfate based on the weight of hide treated. At the end of the six-hour treatment, the hair and a portion of the keratinous layer are substantially removed.

The hide was defleshed and then subjected to a neutralization treatment with a non-toxic acid as described above. The hide was treated with a dilute solution of gluconic acid (pH 5) by soaking overnight. This treatment is effective to completely neutralize excess lime present in the hide and converts the lime into soluble calcium salts which are removed by washing. After neutralization, the hide was split to remove the remaining hair and epidermal layer. Next, the limed and neutralized hide splits are cut into small square or rectangular sections, e.g., ¼–4 inches on a side, soaked in water and squeezed to remove calcium salts and then converted to a fine pulp by successive passes through a meat grinder. In this grinding operation, sufficient ice is mixed with the hide splits to maintain the temperature below about 15° C. The successive passes through the meat grinder use successively smaller dies, the smallest being 3/64 inch. At this point, sufficient water is added to the pulp to produce a mixture consisting of about 90% water and 10% collagen.

The collagen pulp is then treated with sufficient dilute citric acid to produce a pH of 2.5–3.7. After a thorough mixing, the pulp and acid are stored overnight at a temperature of 3° C. to swell. At the end of this time, the collagen will have swollen and taken up all of the water in the slurry. The swollen collagen is mixed with additional water to produce a homogeneous slurry containing 4% collagen and 1.2% citric acid (pH 2.5–3.7). This slurry is further homogenized, filtered to remove any solid contaminants, and deaerated.

The slurry is then pumped under pressure through the extrusion die as previously described into a coagulating bath consisting of 42% ammonium sulfate (sodium sulfate can also be used) in water. When the collagen is extruded as a thin-walled tube into this concentrated solution of ammonium sulfate, the collagen fibrils are dehydrated and collapse to form a film which is sufficiently coherent for further processing. As shown in FIG. 2 of the drawings, the coagulation bath is circulated both inside and outside the tube to maintain the tube in an inflated condition and insure proper coagulation of the casing both on the inside and outside.

The casing next passes into a tanning bath which comprises a solution of 10% ferric ammonium sulfate and 20% ammonium sulfate. In this bath, the casing is hardened or tanned. The casing passes over a series of rollers in the tanning bath to provide multiple passes giving a residence time of at least one minute in the bath.

The casing then passes into a wash bath where it is maintained for a period of about ten minutes by a multiple pass arrangement. After washing, the casing passes through a plasticizing bath consisting of 5% glycerine in water.

From the plasticizing bath, the casing passes through a dryer where it is inflated with compressed air, and heated air is circulated over the surface of the inflated casing. The casing was dried by air maintained at a temperature of 70° C. circulated at a rate of 200 cubic feet per minute. After drying, the casing is preferably shirred but may be first reeled and then shirred prior to packaging. This casing is equivalent in longitudinal and transverse tensile strengths to casing prepared from unlimed collagen produced in accordance with well known prior art procedures. Casings made by the above-described method are uniform in diameter and in wall thickness. The casing is formed of a smooth film which is substantially free of collagen fibers of macroscopic size. The casing film is translucent and apparently formed of collagen fibrils that are essentially randomly oriented. The orientation of collagen fibrils in the film and the resulting relative variation in longitudinal and transverse strength is largely a function of the conditions of extrusion and the type of extruder used.

While we have described this invention fully and completely with special emphasis upon several preferred embodiments, we wish it to be understood that within the scope of the appended claims the invention may be practiced otherwise than as specifically described herein.

What is claimed is:
1. A method of preparing an edible tubular collagen casing which consists of
   treating an animal hide selected from the group consisting of fresh hides and salt-cured hides with a lime-containing solution for a time, in the range from 3–12 hours, sufficient to at least partially dehair the hide,
   mechanically removing the epidermal layer and remaining hair,
   neutralizing the lime in the hide by treatment with a non-toxic acid capable of forming a soluble calcium salt, at a pH of 2.5–6.5, and washing to remove by-product salts,
   defleshing the hide and cutting the hide into pieces,
   grinding the hide pieces at a temperature less than about 20° C. to produce a slurry of finely-divided collagen in water,
   treating the slurry with an acid at a pH of 2.5–3.7 to swell the collagen and adjust the collagen content of the slurry to the range of 2–6%,
   extruding the slurry through an annular die to form a collagen tube,
   immersing the tube in a coagulating bath,
   tanning the collagen tube, and
   washing, plasticizing, and drying the tube to produce a translucent non-fibrous edible product.

2. A method as defined in claim 1 in which the acid used to neutralize the limed hide is malic acid, maleic acid, butyric acid, isobutyric acid, fumaric acid, succinic acid, valeric acid, glutamic acid, levulinic acid, lactic acid, citric acid, acetic acid, propionic acid, caprylic acid, gluconic acid, benzoic acid, malonic acid, ascorbic acid, glycerophosphoric acid, hydrochloric acid, or phosphoric acid.

References Cited

UNITED STATES PATENTS

| 3,123,482 | 3/1964 | Lieberman | 99—176 |
| 3,194,865 | 7/1965 | Fagan et al. | 99—176 X |
| 3,235,641 | 2/1966 | McKnight. | |

HYMAN LORD, *Primary Examiner.*

UNITED STATES PATENT OFFICE
CERTIFICATE OF CORRECTION

Patent No. 3,408,918          Dated November 5, 1968

Inventor(s) Robert D. Talty et al.

It is certified that error appears in the above-identified patent and that said Letters Patent are hereby corrected as shown below:

Column 3, line 31, "aid" should read -- acid --. Column 4, line 62, after "collagen" insert a period; line 62, "the" should read -- The --; line 67, "plasticier" should read -- plasticizer --. Column 5, line 50, "or" should read -- of --. Column 6, line 52, "hour" should read -- hours --. Column 8, line 39, "path" should read -- bath --. Column 9, line 58, "Casing" should read -- Casings --; line 63, "essential" should read -- essentially -- Column 10, line 63, "Casing" should read -- Casings --; line 71, "funtcion" should read -- function --.

Signed and sealed this 27th day of June 1972.

(SEAL)
Attest:

EDWARD M. FLETCHER, JR.
Attesting Officer

ROBERT GOTTSCHALK
Commissioner of Patents